United States Patent
Nagaraja et al.

(10) Patent No.: US 11,936,651 B2
(45) Date of Patent: Mar. 19, 2024

(54) AUTOMATED ACCOUNT RECOVERY USING TRUSTED DEVICES

(71) Applicant: Visa International Service Association, San Francisco, CA (US)

(72) Inventors: Vinjith Nagaraja, Austin, TX (US); Dhruv Vig, Austin, TX (US); Raymond Brammer, Round Rock, TX (US); Vamshi Ramarapu, Austin, TX (US); James Myers, Round Rock, TX (US); David Capezza, Washington, DC (US); Nagaveera Venkata Su Tavvala, Cedar Park, TX (US); Swapneel Mahajan, Cupertino, CA (US); Shalini Mayor, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 864 days.

(21) Appl. No.: 16/970,770

(22) PCT Filed: Feb. 20, 2019

(86) PCT No.: PCT/US2019/018756
§ 371 (c)(1),
(2) Date: Aug. 18, 2020

(87) PCT Pub. No.: WO2019/164935
PCT Pub. Date: Aug. 29, 2019

(65) Prior Publication Data
US 2021/0099444 A1    Apr. 1, 2021

Related U.S. Application Data

(60) Provisional application No. 62/632,989, filed on Feb. 20, 2018.

(51) Int. Cl.
*H04L 29/06* (2006.01)
*G06Q 10/0635* (2023.01)
(Continued)

(52) U.S. Cl.
CPC ..... *H04L 63/0876* (2013.01); *G06Q 10/0635* (2013.01); *G06Q 30/0185* (2013.01);
(Continued)

(58) Field of Classification Search
CPC . H04L 63/0876; H04L 9/0866; H04L 63/083; H04L 63/102; H04L 67/146;
(Continued)

(56) References Cited

U.S. PATENT DOCUMENTS 9,348,981 B1 * 5/2016 Hearn ................... H04L 9/3271
9,491,155 B1 * 11/2016 Johansson ............. G06F 21/604
(Continued)

FOREIGN PATENT DOCUMENTS

EP    2750348    7/2014

OTHER PUBLICATIONS

Application No. EP19755797.8, Extended European Search Report, dated Mar. 17, 2021, 7 pages.
(Continued)

*Primary Examiner* — Ka Shan Choy
(74) *Attorney, Agent, or Firm* — Kilpatrick Townsend & Stockton LLP (57) ABSTRACT

Embodiments of the invention are directed to an automated account restoration system. In some embodiments, the system determines a state of an account based on a likelihood that the account has been compromised. If the account is determined to be in a low-risk state, then upon an successful login to that account, a verification cookie may be generated which is unique to a user device used to access the account. If the account is determined to be in a high-risk state, then system may prevent access to the account except by user devices that include a valid verification cookie.

18 Claims, 6 Drawing Sheets

(51) Int. Cl.
  *G06Q 30/018* (2023.01)
  *H04L 9/08* (2006.01)
  *H04L 9/40* (2022.01)
  *H04L 67/146* (2022.01)
  *H04L 67/303* (2022.01)

(52) U.S. Cl.
  CPC .......... *H04L 9/0866* (2013.01); *H04L 63/083* (2013.01); *H04L 63/102* (2013.01); *H04L 67/146* (2013.01); *H04L 67/303* (2013.01); *G06Q 2220/00* (2013.01)

(58) Field of Classification Search
  CPC .............. H04L 67/303; G06Q 10/0635; G06Q 30/0185; G06Q 2220/00; G06F 21/316; G06F 21/44; G06F 2221/2151; G06F 21/57
  See application file for complete search history.

(56) References Cited

U.S. PATENT DOCUMENTS

| | | | | |
|---|---|---|---|---|
| 10,262,129 | B1* | 4/2019 | Gupta | H04L 63/0823 |
| 2002/0087894 | A1* | 7/2002 | Foley | H04L 63/0853 |
| | | | | 726/4 |
| 2005/0154887 | A1* | 7/2005 | Birk | G06F 21/41 |
| | | | | 713/168 |
| 2005/0268107 | A1 | 12/2005 | Harris et al. | |
| 2009/0024663 | A1* | 1/2009 | McGovern | G06F 21/577 |
| 2012/0317620 | A1* | 12/2012 | Fefelov | G06F 16/9535 |
| | | | | 726/4 |
| 2013/0254857 | A1 | 9/2013 | Bajenov et al. | |
| 2013/0254875 | A1 | 9/2013 | Sama | |
| 2014/0101733 | A1* | 4/2014 | Cain | G06F 21/31 |
| | | | | 726/5 |
| 2014/0208386 | A1 | 7/2014 | Sama | |
| 2018/0337907 | A1* | 11/2018 | Bhansali | H04L 9/3231 |
| 2018/0343246 | A1* | 11/2018 | Benayed | H04L 9/3226 |

OTHER PUBLICATIONS

Application No. PCT/US2019/018756, International Search Report and Written Opinion, dated May 29, 2019, 14 Pages.
Sahoo et al., "Securing Web API Based on Token Authentication", International Journal on Advanced Electrical and Computer Engineering (IJAECE), Available Online at, URL:<http://www.irdindia.in/journal_ijaece/pdf/vol4_iss2/1.pdf>, 2017, pp. 1-4.
Application No. SG11202007383U, Written Opinion, dated Jun. 29, 2022, 5 pages.

* cited by examiner

AUTOMATED ACCOUNT RECOVERY USING TRUSTED DEVICES

CROSS-REFERENCE TO RELATED APPLICATIONS

The present application is a 371 National Phase of PCT Patent Application No. PCT/US2019/018756 filed on Feb. 20, 2019, which claims priority to U.S. Patent Application No. 62/632,989, filed on Feb. 20, 2018, the disclosures of which are herein incorporated by reference in their entirety for all purposes.

BACKGROUND

Hackers are able to obtain a wide range of confidential information by causing data breaches. This confidential information may include a variety of payment information (credit card, etc.), credentials, personal account information (PAI) (email, phone number, etc.) and personal identification information (PII). In some cases, a hacker that obtains an account password is able to gain access to a user's account and is subsequently able to take that account over. Often, a user may use the same password for each of his or her accounts with different entities. Hence, if a hacker gains access to one account for a user, then he or she is then usually able to compromise other accounts belonging to that user as well. This makes account restoration for a compromised user especially difficult. For example, it may not be advisable to separately communicate with the user via his or her email, as that email account may also be compromised. This often results in a user being required to manually contact a customer service/fraud representative (e.g., via phone) to regain access to his or her account. This is time-consuming for the user and presents a number of security challenges to the system that maintains the account.

Embodiments of the present invention address these problems and other problems, individually and collectively.

SUMMARY

Described herein are techniques for automating restoration of an account to its rightful owner using trusted devices. A service provider may maintain a number of accounts, each of which is associated with a different user of a service provided by the service provider. For each of these accounts, the service provider may assess a current state of the account based on the likelihood that the account has been compromised. For example, an account may be placed in a high-risk state if a potential data breach has been detected whereas the account may be placed in a low-risk state if there is no reason to believe that the account has been compromised. Embodiments of the current disclosure may be used to automatically (e.g., without user intervention) change the state associated with an account from a high-risk state to a low-risk state.

In some embodiments, each time that a user attempts to access an account maintained by a service provider using a user device, the service provider may check the memory of the user device for a verification cookie. This may be done upon obtaining login credentials from the user or at some other time. Upon determining that the user device does not currently have a verification cookie, and upon determining that the account is in a low-risk state, the service provider may generate a verification cookie unique to that user device. In some embodiments, the verification cookie may be associated with a particular date/time. Upon determining that the account is in a high-risk state, the service provider may, assuming that the account credentials are valid, determine whether the user device from which the account is being accessed is a trusted device (e.g., the user device includes a valid verification cookie). If the user device is not a trusted device, then the service provider may prevent access to the account even if the account credentials are valid. In some embodiments, accounts at a service provider may only be accessed by a user device having a valid verification cookie, and upon receiving valid account credentials. In some embodiments, a service provider may require that a user complete a password reset process upon successful login to a high-risk account in the manner described herein.

One embodiment of the invention is directed to a method comprising receiving a request to access an account, the request including a device identifier and login credentials, and determining whether the account is in a high-risk state or a low-risk state. The method further comprising, upon determining that the account is in a low-risk state, and upon determining that the login credentials are valid: generating a verification cookie from the device identifier, providing the verification cookie to the user device for storage in a memory of the user device, and providing access to the account via the user device. The method yet further comprising, upon determining that the account is in a high-risk state, and upon determining that the login credentials are valid: retrieving the verification cookie from the memory of the user device, determining whether the verification cookie is valid, and providing access to the account via the user device only if the verification cookie is valid.

Further details regarding embodiments of the invention can be found in the Detailed Description and the Figures.

DETAILED DESCRIPTION

Prior to discussing specific embodiments of the invention, some terms may be described in detail.

A "computing device" may be any suitable electronic device capable of communicating with, and/or interacting with other devices. Examples of computing devices may include a mobile phone, a smart phone, a personal digital assistant (PDA), a laptop computer, a desktop computer, a server computer, a vehicle (e.g., an automobile), a thin-client device, a router, a modem, a tablet PC, a printer, etc. Additionally, computing devices may be any type of wearable technology device, such as a watch, earpiece, glasses, etc. The computing device may include one or more processors capable of processing input. The computing device may also provide remote communication capabilities to a network. Examples of remote communication capabilities include using a mobile phone (wireless) network, wireless data network (e.g., 3G, 4G or similar networks), Bluetooth, Bluetooth Low Energy (BLE), Wi-Fi, Wi-Max, or any other communication medium that may provide access to a network such as the Internet or a private network. A computing device may be associated with a username, a password, an electronic identifier, one or more asymmetric keys that may be used for asymmetric encryption, one or more symmetric keys that may be used for symmetric encryption, or the like. A computing device may be configured to access and/or manage a distributed database (e.g., a blockchain).

A "cookie" (aka, a "web cookie," "Internet cookie," or "browser cookie") may be any suitable piece of data sent from a webserver and stored on a user's computer. A cookie may be placed on a user's computer by the computer's web browser while the user is browsing a website maintained by the webserver.

A "device identifier" may include any suitable indicia to identify a device. For example, a device identifier may include any series of characters, numbers, graphics, symbols, or other information that may be associated with an electronic device. Typically, a device identifier is utilized to uniquely identify the electronic device in order to initiate one or more functions remotely. For example, a network address may be an example of a device identifier that may be used to initiate one or more operations to be performed by the electronic device. In this example, an instruction to initiate the operation may be transmitted to the network address.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. Suitable implementations for an operating system and general functionality of the servers are known or commercially available and are readily implemented by persons having ordinary skill in the art, particularly in light of the disclosure herein.

A "service provider computer" or "service provider" may include any system associated with an entity that provides a resource or service. In some embodiments, the service provider may handle functionality of a computer application associated with the entity that provides the resource or service. The service provider may provide any suitable service. For example, the service provider may be a merchant, a utility company, a payment processing network, a wallet provider, a merchant, a website operator, or a bank.

A "transaction" may be any interaction or exchange between two or more parties. For example, a transaction may include a first entity requesting resources from a second entity. In this example, the transaction is completed when the resources are either provided to the first entity or the transaction is declined.

A "user device" may be a device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

Figure 1:
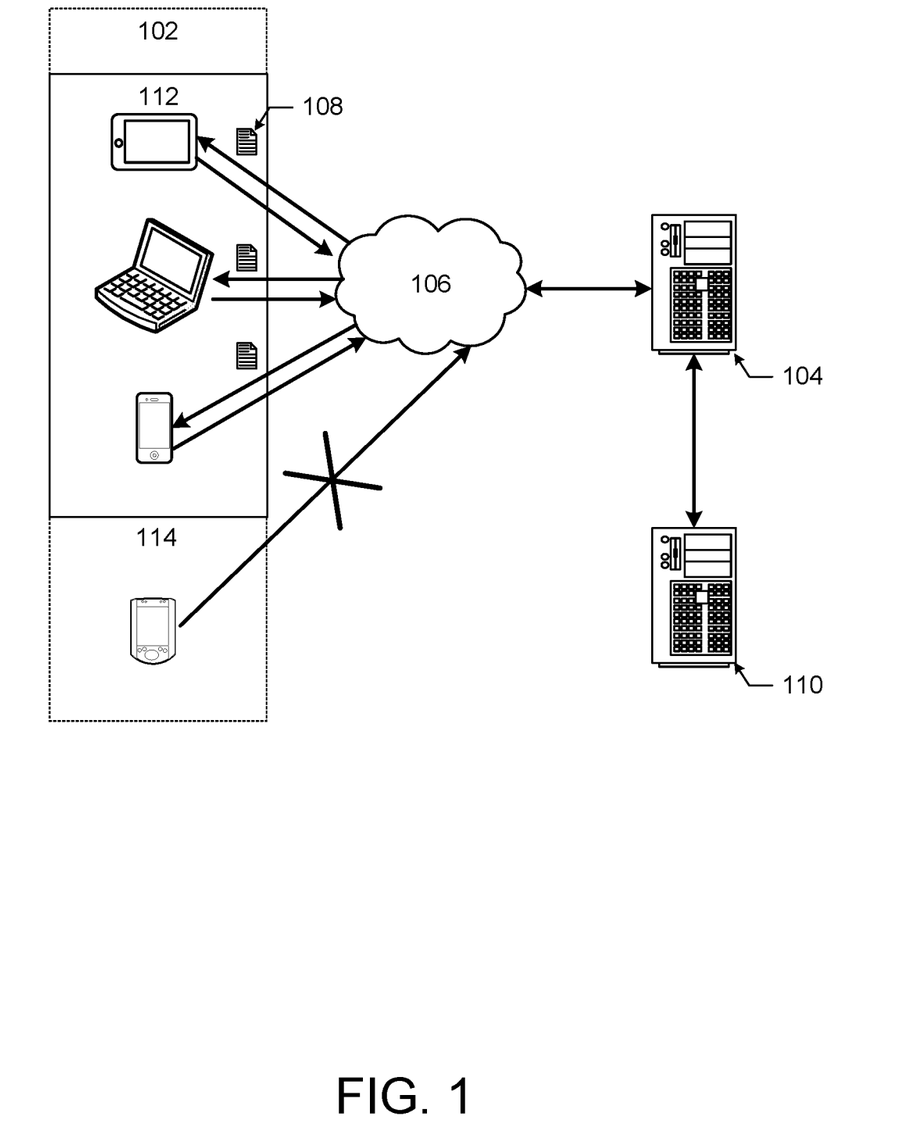
FIG. 1 depicts an illustrative example of interactions that may take place in a system which provides for automatic account restoration in accordance with at least some embodiments.

FIG. 1 depicts an illustrative example of interactions that may take place in a system which provides for automatic account restoration in accordance with at least some embodiments. In FIG. 1, a number of user devices 102 may be used to access an account maintained by a service provider 104. The service provider 104 may maintain a number of accounts, each of which is associated with a different user of a plurality of users. In at least some embodiments, the user devices 102 may interact with the service provider 104 via a network 106. For example, an account maintained by the service provider may be accessed via a website accessible via the network 106.

In the course of interactions between one or more of the user devices 102 and the service provider 104 (e.g., during an attempted login), the user devices may transmit a device identifier to the service provider 104. The service provider 104 may, upon receiving the device identifier, submit that device identifier, and potentially an account identifier, to some code generation technique to generate a key value. The code generation technique may involve any suitable algorithm intended to convert a string of characters provided as input into some re-creatable output. It is important that the re-creatable output can only be re-created using the code generation technique herein and that the code generation technique is not easily ascertained. For example, the code generation technique may be an encryption algorithm or a hashing algorithm executed from a secure memory of the service provider 104. The code generation technique must be consistent, in that each time that a particular input is provided to the code generation technique, the same output should be generated. A verification cookie 108 may then be generated to include the output of the code generation technique.

Once the service provider 104 has generated an verification cookie 108 using one or more code generation techniques, the verification cookie 108 may be provided to the user device, where it may be placed within cookie storage in the memory of the device. Each cookie stored on each device in this manner may be associated with a timestamp that indicates a time that the verification cookie 108 was first generated. In some embodiments, a date associated with the verification cookie 108 may be used as input by the service provider 104 in the code generation technique in order to prevent tampering of the date/time stamp. In some embodiments, the service provider 104 may retrieve the verification cookie 108 from the user device 102 each time that the user device is used to log into an account at the service provider.

In embodiments, the service provider 104 may receive an indication that an account maintained by the service provider has been compromised. For example, the service provider 104 may receive an indication that an account/password combination has been disclosed on a website or otherwise exposed to unauthorized individuals. In some embodiments, the indication may be provided by a third party computer 110, such as a web server which hosts a website upon which the account/password combination has been disclosed.

Upon receiving an indication that an account has potentially been compromised, the service provider 104 may update a state associated with the account from a low-risk state to a high-risk state. When an account maintained by the service provider 104 is in a low-risk state, the service provider may enable any user device 102 to access the account so long as the correct login credentials (e.g., username and password) are provided. When an account maintained by the service provider 104 is in a high-risk state, the service provider may retrieve the verification cookie stored on a particular device prior to enabling login from that device. In some embodiments, the service provider 104 may identify a date/time that the breach likely occurred (i.e., a breach date). The service provider 104 may then determine whether the verification cookie 108 on a particular device (if the device even has one) is valid and was created prior to the breach date. In some embodiments, the service provider 104 may determine whether a verification cookie is valid and was generated at least some predetermined amount of time prior to the breach date. If the user device includes a verification cookie that was generated an appropriate amount of time before the breach date, then the user device may be considered a trusted device 112. Otherwise the user device may be considered an unverifiable user device 114. To determine whether a verification cookie is valid, the service provider 104 may obtain information related to the user device 102 as well as any additional inputs (e.g., an account identifier and/or verification cookie creation date). In some embodiments, the service provider may then independently generate an obfuscated output using the code generation techniques above. In these embodiments, the content of the verification cookie may be compared to the independently generated output to determine the validity of the verification cookie. In some embodiments, the service provider 104 may use one or more cryptography techniques to decrypt the content of the verification cookie. In these embodiments, the decrypted content may then be compared to the obtained data to determine the validity of the verification cookie.

In accordance with at least some embodiments, the service provider 104, in the scenario above, may only grant account access to user devices 112. In some embodiments, the service provider 104, upon determining that a user device 102 is a trusted device 112, the service provider 104 may provide a password reset prompt to the user device 112 in order to force the user to reset his or her password. In some embodiments, the service provider 104 may provide the user device 112 with details related to the detected breach. Once a password reset has been submitted via the trusted device 112, the service provider 104 may change the state of the account from a high-risk state to a low-risk state. If the service provider 104 determines that the account is in a high-risk state, then the service provider 104 may prevent or block access to the account from unverifiable devices 114, regardless of whether valid credentials are provided along with the response.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications policy. In at least some embodiments, each component of the depicted architecture may represent one or more special purpose devices configured to perform the described functions. In some embodiments, each component of the depicted architecture may comprise a cluster or group of devices that each perform the same, or a similar, function.

Figure 2:
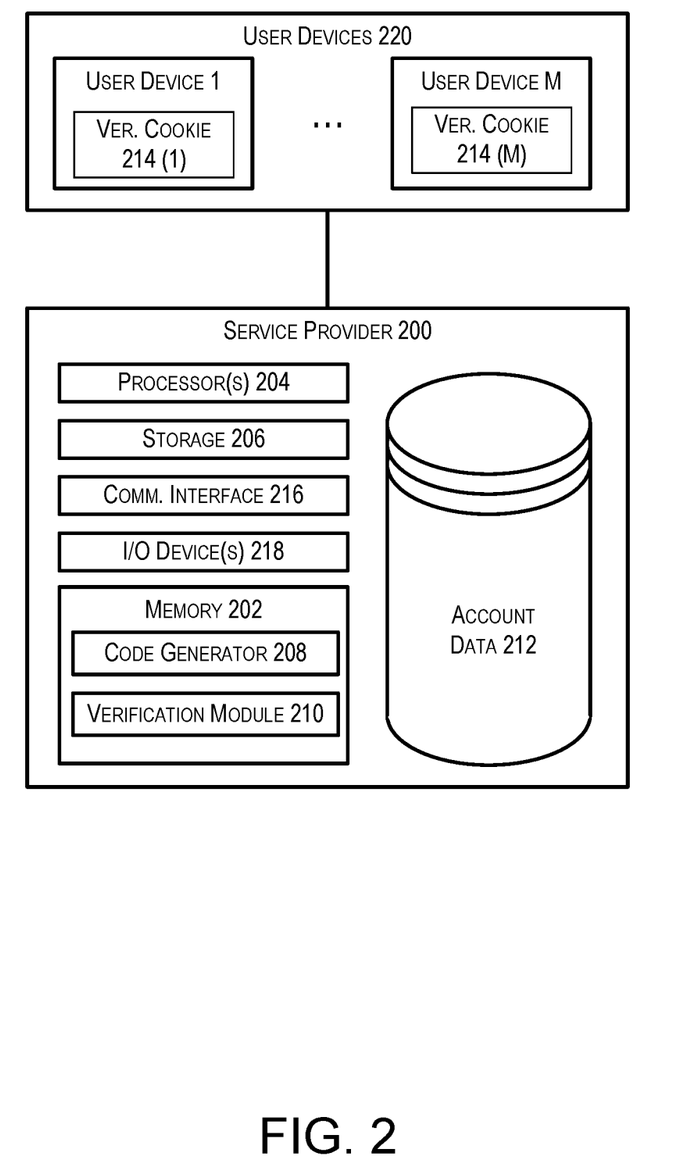
FIG. 2 depicts a diagram of an exemplary service provider computer 200 that may be configured to enable automatic recovery of a compromised account in accordance with at least some embodiments.

FIG. 2 depicts a diagram of an exemplary service provider computer 200 that may be configured to enable automatic recovery of a compromised account in accordance with at least some embodiments. The service provider computer 200 may be an example service provider computer 104 described with respect to FIG. 1.

The service provider computer 200 may be any type of computing device capable of identifying an account from a request received via a user device, determining a status of the account, and determining a level of trust to assign to the user device. In at least some embodiments, the service provider computer 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service provider computer 200, the memory 202 may be volatile (such as random access memory (RAM)) and/or non-volatile (such as read-only memory (ROM), flash memory, etc.). The service provider computer 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the service provider computer 200. In some embodiments, the memory 202 may include multiple different types of memory, such as static random access memory (SRAM), dynamic random access memory (DRAM) or ROM.

Turning to the contents of the memory 202 in more detail, the memory 202 may include an operating system and one or more application programs or services for implementing the features disclosed herein including at least a module for generating a code and/or verification cookie (code generator 208) and a module for verifying a code received from a user device (verification module 210). The memory 202 may also include account data 212, which maintains information associated with individual accounts.

In some embodiments, the code generator 208 may, in conjunction with the processor 204, be configured to receive a request for account access from a user device and generate a verification cookie unique to that account and to that user device. In some embodiments, a user may attempt to access his or her account via a user device (e.g., via a web browser on the user device) by accessing a webpage associated with the service provider. Upon detecting this attempt to access the account, the service provider may obtain account credentials (e.g., an account identifier and account password (or a hash of an account password)) provided in relation to the access attempt. Additionally, the user device may transmit a device identifier (e.g., a serial number or other identifier unique to a particular user device) to the service provider 200 during the access attempt. In some embodiments, the service provider 200 may, upon detecting the attempted account access, determine whether the user device already has a verification cookie in memory before activating the code generator 208.

The code generator 208 may be configured to use the received device identifier, along with the account identifier and potentially an access date, to generate a code. In some embodiments, each piece of data to be used may be appended to a string of text, which may then be hashed, encrypted, or otherwise obfuscated. The result of this procedure is a code which is (most likely) unique to a particular account, user device, (potentially) date, or any other suitable distinguishing feature. The code generator 208 may then generate a verification cookie 214 to include the unique code generated by the code generator 208. Once generated, the service provider 200 may provide the verification cookie 214 to the user device to be stored in its memory. In some embodiments, the user device may store, in addition to the verification cookie, an indication of the date upon which the verification cookie was generated (e.g., a timestamp).

In some embodiments, the verification module 210 may, in conjunction with the processor 204, be configured to verify whether or not a user device is a trusted device based at least in part on a verification cookie stored on the user device in accordance with at least some embodiments. As pointed out above, upon detecting an attempt to access an account, the service provider may obtain account credentials from a user device. The service provider may also obtain a verification cookie 214 which was previously generated by the code generator 208 and is currently stored on the user device. The verification module 210 may be configured to verify the code within the verification cookie 214. In some embodiments, the verification module 210 may independently generate the code, or execute the code generator 208 to independently generated the code, from the device identifier and other relevant information. In this scenario, the verification module 210 may compare the independently generated code to the code within the verification cookie. If the codes match, then the verification module 210 may determine that the verification cookie is valid. In some embodiments, the verification module 210 may decrypt the code within the verification cookie and compare the decrypted information to the raw data received from the user device.

In some embodiments, the service provider 200 may determine whether the account is currently in a high-risk state or a low-risk state. If the account is in a low-risk state, and if the service provider determines that the verification cookie 214 is present on the user device, then the service provider 200 may proceed with the log in process in the usual manner. If the account is in a low-risk state, and if the service provider determines that the verification cookie 214 is not present on the user device, then the service provider 200 may initiate the code generator 208 to generate the verification cookie 214. If the account is in a high-risk state, and if the service provider determines that the verification cookie 214 is not present on the user device, then the service provider 200 may prevent the user device from gaining access to the account, even if the login credentials are valid. If the account is in a high-risk state, and if the service provider determines that the verification cookie 214 is present on the user device, then the service provider 200 may determine whether a date associated with the creation of the verification cookie 214 is before or after some predetermined threshold date (e.g., a breach date). If the date associated with the creation of the verification cookie 214 is before the threshold date, then the service provider 200 may initiate the verification module 210 to verify that the verification cookie is authentic, and either grant or prevent access to the account based on the authenticity of that verification cookie. Otherwise, if the date associated with the creation of the verification cookie 214 postdates the threshold date, then the service provider 200 may simply prevent the user device from accessing the account.

The service provider computer 200 may also contain communications interface(s) 216 that enable the service provider computer 200 to communicate with a stored database, another computing device or server, one or more remote devices, and/or any other suitable electronic devices. In some embodiments, the communication interface 216 may enable the service provider computer 200 to communicate with other electronic devices on a network (e.g., on a private network). The service provider computer 200 may also include input/output (I/O) device(s) and/or ports 218, such as for enabling connection with a keyboard, a mouse, a pen, a voice input device, a touch input device, a display, speakers, a printer, etc.

The service provider computer 200 may be in communication with a number of user devices 220 (1-M). Each of the user devices 220 may be capable of interacting with the service provider 200 to access an account. For example, the user devices 220 may include a web browser or other application that enables a user of the user device 220 to access a website maintained by the service provider 200. Each of the user devices 220 may be independently capable of storing (e.g., in memory) a verification cookie 214 unique to that user device 220.

Figure 3:
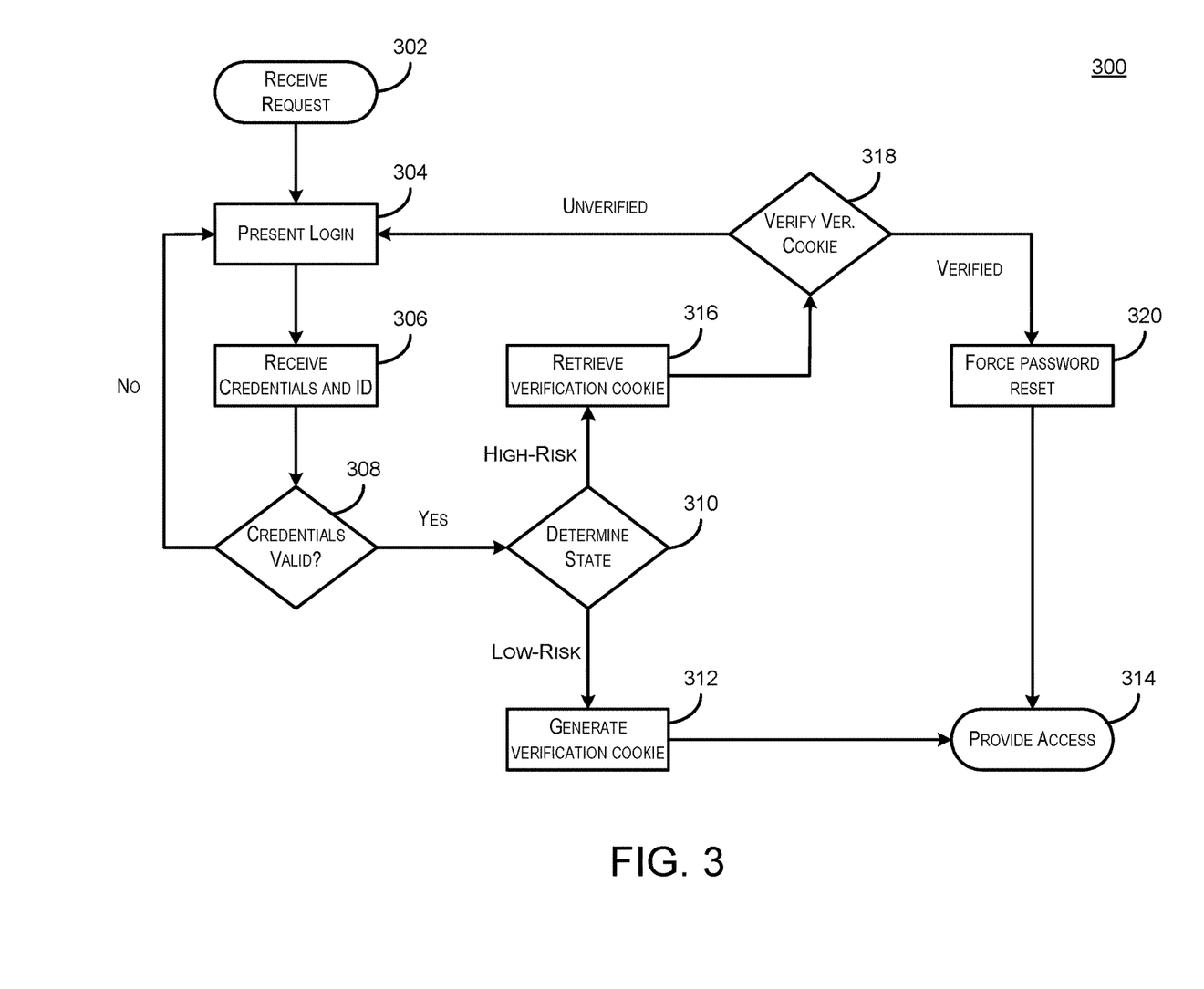
FIG. 3 depicts a flow chart illustrating an example process for automatically restoring account access using trusted devices in accordance with at least some embodiments.

FIG. 3 depicts a flow chart illustrating an example process for automatically restoring account access using trusted devices in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the service provider 200 depicted in FIG. 2. The code may be stored on a computer-readable storage medium, for example, in the form of a computer program including a plurality of instructions executable by one or more processors. The computer-readable storage medium may be non-transitory.

Process 300 may begin at 302, when a request is received to access an account maintained by the service provider. The request may be received in relation to a particular user device. For example, a user wishing to access his or her account may execute a browser application on the user device and navigate over a network, using that browser application, to a website operated by the service provider 200. The user may then select a login option on the website.

Upon receiving an indication that the user has elected to log into an account, the service provider may present (to the browser application) a login page at 304. The user may then attempt to log into the account by entering account credentials (e.g., a username and password). In addition to receiving these account credentials at 306, the service provider may also receive a device identifier from the user device. In some embodiments, the service provider may also check for a verification cookie stored on the user device at this time.

At 308, the service provider may determine whether or not the credentials are valid. If the credentials are not valid, then the service provider may return to step 304 by presenting a login page to the user. In some embodiments, the service provider may only allow a predetermined number of login attempts before disabling the account or activating some sort of timeout.

At 310, the service provider may determine a current state of the account. If the service provider has identified a potential breach with respect to the account, then the service provider may determine that the account is to be considered in a high-risk state. If no breach of the account has been detected, then the service provider may consider the account to be in a low-risk state. It should be noted that step 310 may occur prior to step 308, in that the state of the account may be determined prior to making a determination that the credentials are valid. In some embodiments, in the event that the service provider determines that the account is in a high-risk state, the service provider may also determine whether the account credentials have been changed recently (e.g., within some threshold amount of time). In the event that the service provider determines that the account credentials have been recently updated, the service provider may elect to accept either the new or old credentials at step 308. In some situations, a hacker that takes over an account will often change the password of the account in order to prevent the actual owner from regaining access. By allowing the use of an old password for an account for which the password has recently been changed, the service provider can prevent a hacker from barring the actual owner from the account.

Upon determining that the account is in a low-risk state, the process may involve generating a verification cookie at 312. In some embodiments, the process may first determine whether the user device already has a verification cookie stored within its memory, and may only generate a verification cookie upon determining that a verification cookie is not currently present. In some embodiments, the process may generate a new verification cookie that may replace an existing verification cookie already stored on the device. For example, a new verification cookie may be generated to include all the same data as the current verification cookie, but with an updated access date (the date on which an account was last accessed by the user device). The process may then proceed to step 314, in which access may be granted to the account via the user device.

Upon determining that the account is in a high-risk state, the process may involve retrieving a verification cookie 316 from the memory of the user device. In some embodiments, the retrieval of the verification cookie from the user device may be performed prior to step 316 (e.g., at 306). If the account is determined to be in a high-risk state, and the user device does not have a verification cookie in memory, then the process may involve simply preventing the user device from accessing the account. It should be noted that this may be done regardless of whether the provided account credentials are valid.

Once the verification cookie has been retrieved, the process may involve validating a code within that verification cookie 318. In some embodiments, the service provider may independently generate the code from data provided (e.g., the device identifier, an account identifier, etc.). In some embodiments, the service provider may decrypt the code and compare the decrypted data to the data provided. In some embodiments, the service provider may maintain an indication of a breach date which a date associated with the verification cookie must predate in order for the verification cookie to be considered valid. In some embodiments, the breach date may be a date upon which a breach of the account was detected. In some embodiments, the breach date may be a date which is some predetermined amount of time before the date upon which a breach of the account was detected. For example, the service provider may, upon detecting a breach of an account on date X, set a breach date of date Y which is three days prior to date X. The process may then require that, to be valid, a verification cookie must have been generated on or before the breach date of Y. If the process is unable to validate the verification cookie, either because the code is not determined to be valid or because the date associated with the verification cookie does not predate the breach date, then the process may involve preventing access to the account and returning to step 304 by presenting a login page. In some embodiments, the process may also provide a message or notification to the user. In some embodiments, the notification may include an indication that the user device is not a trusted device. In some embodiments, the notification may include an indication that the username and/or password is incorrect (even if the username and password are correct) in order to convince an unauthorized party that they do not actually have the correct login credentials.

Upon determining that the verification cookie is valid, the process may proceed to step 314 and grant access to the account to the user device. In some embodiments, the process may force the user to reset his or her password at 320. For example, in some embodiments the service provider may present a password reset webpage to the user that must be completed before proceeding to the webpage associated with account information. Upon completion of the password reset, the account may be placed into a low-risk state by the service provider.

Figure 4A:
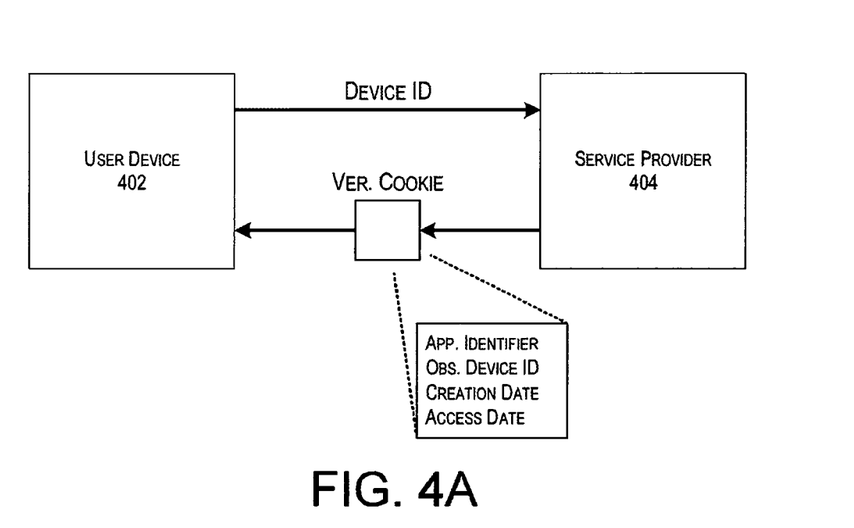
FIG. 4A depicts a block diagram illustrating an example process for generating a verification cookie in accordance with at least some embodiments.
Figure 4B:
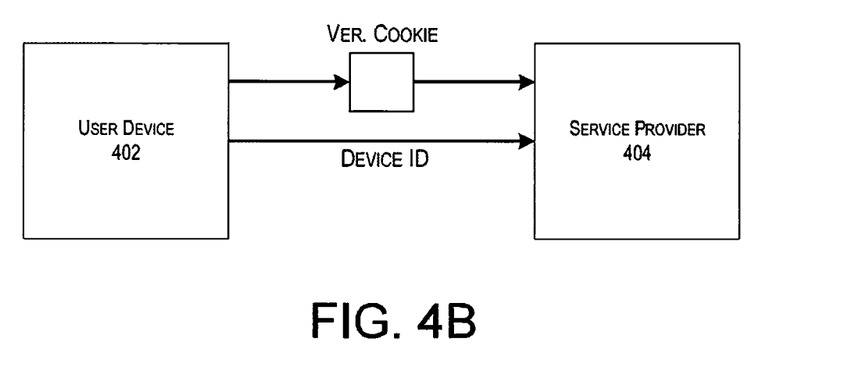
FIG. 4B depicts block diagram illustrating an example process for verifying a verification cookie of a user device in accordance with at least some embodiments.

FIG. 4 depicts block diagrams illustrating an example process for generating, and subsequently verifying, a verification cookie for a user device based on interactions between components of the system conducted in accordance with at least some embodiments. The process of FIG. 4 is depicted in two parts: FIG. 4A and FIG. 4B.

FIG. 4A depicts a block diagram illustrating an example process for generating a verification cookie in accordance with at least some embodiments. In some embodiments, a user device 402, during a login phase, may provide a device identifier (device ID) to the service provider 404. In some embodiments, a device identifier may be a device fingerprint, which may be any information collected about a remote computing device for the purpose of identification, even when cookies are turned off on that device. In some embodiments, the user device 402 may also transmit a current verification cookie, or alternatively, an indication that no current verification cookie exists. The device identifier may be retrieved by the service provider 404 from the user device 402 before or after the service provider determines a state (e.g., high-risk or low-risk) of an account to which the user device is attempting to gain access (e.g., step 310 of process 300 described with respect to FIG. 3).

Upon receiving the device identifier, the service provider may, provided that the current state of the account is determined to be a low-risk state, generate a verification cookie. In some embodiments, the generated verification cookie may be a new cookie generated in accordance with the system described herein to be stored in memory of the user device 402. In some embodiments, the generated verification cookie may replace a current verification cookie currently stored in memory of the user device 402.

To generate a verification cookie, the service provider 404 may create a identifier that includes an obscured version of the device identifier and other information (e.g., an offset value). In some cases, this may involve encrypting the device identifier using a cryptographic key. In some cases, this may involve hashing the device identifier using one or more key values and an algorithm. In at least some of these cases, the one or more key values and/or the hash algorithm may be kept secret from the public to prevent forgery of the verification cookie. In addition to an obscured device identifier, the verification cookie may include at least an application identifier that indicates applications (e.g., mobile applications, websites, particular service providers, etc.) that the verification cookie is applicable to. The verification cookie may also include a creation date and/or a last access date. The creation date may store an indication as to the date that the verification cookie was first created for the user device 402, whereas a last access data may indicate the date upon which the verification cookie was last updated (i.e., upon successful login via the user device).

In some embodiments, at least some portion of the verification cookie itself may be encrypted using a cryptographic key. For example, the verification cookie may include an unencrypted application identifier whereas the rest of the data in the verification cookie is encrypted. This will allow a service provider 404 to identify verification cookies which are relevant to services that it provides while limiting the data which can be obtained by that service provider.

Upon generation of the verification cookie by the service provider 404, the service provider may provide the verification cookie to the user device 402. In some embodiments, the verification cookie may replace a current verification cookie stored in the memory of the user device 402 with respect to the service provider 404. In some embodiments, the user device 402 may maintain a mapping between the service provider 404 and the verification cookie stored in memory.

FIG. 4B depicts block diagram illustrating an example process for verifying a verification cookie of a user device in accordance with at least some embodiments. In FIG. 4B, the user device 402 provides the verification cookie and a device identifier to the service provider 404 during an account login attempt. The service provider 404 may then determine whether a current state of the account is a high-risk or low-risk state. Upon determining that the current state of the account is a low-risk state, the service provider 404 may simply generate a replacement verification cookie to replace the verification cookie stored in memory of the user device 402 as described above with respect to FIG. 4A.

Upon determining that the current state of the account is a high-risk state, the service provider 404 may compare a breach date (e.g., a date associated with a potential breach of a user's confidential data) to a creation date and/or access date of the verification cookie. If the creation date of the verification cookie is after the breach date, then the service provider 404 may reject the account login attempt. In this case, a two factor authentication (e.g., involving phone and one-time passcode) or a customer support call may be required to gain access to the account, reset the password and/or create a new verification cookie to be stored on the user device 402. This is because an attacker could have used the credentials compromised in a security breach to login to the user's account. In some embodiments, if the creation date is prior to the breach date, but the access date is after the breach date, then the service provider 404 may determine whether the access date in the verification cookie matches a date on which the account was latest accessed. If the two do not match, then the service provider 404 may flag the latest access attempt as potentially fraudulent.

Upon determining that the current state of the account is a high-risk state, and upon determining the creation date is prior to a breach date, the service provider 404 may verify the authenticity of the verification cookie. In some embodiments, this may involve comparing a device identifier in the verification cookie to the device identifier provided by the user device 402. In some embodiments, this may involve independently obscuring (i.e., hashing) the provided device identifier and comparing that obscured device identifier to the obscured device identifier included within the verification cookie. In some embodiments, this may involve decrypting the obscured device identifier (assuming it is encrypted) within the verification cookie and comparing the decrypted device identifier to the device identifier provided by the user device 402. In the event that the device identifier provided by the user device 402 matches the device identifier included within the verification cookie, the verification cookie is authenticated and the user device 402 is verified. In the event that the device identifier provided by the user device 402 does not match the device identifier included within the verification cookie, the verification cookie is not authenticated and the login attempt may be declined.

Figure 5:
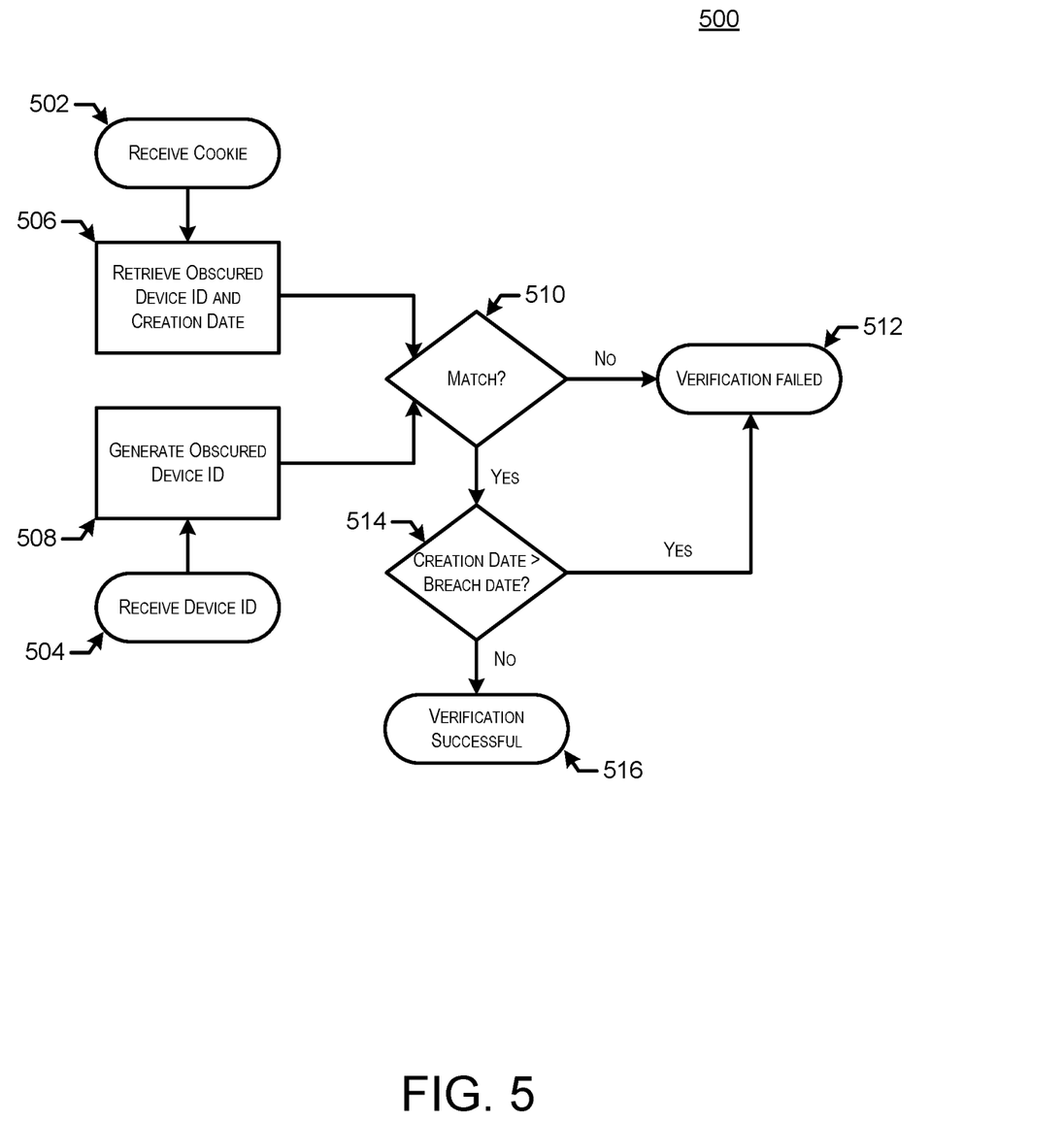
FIG. 5 depicts a flow chart illustrating an example process for verifying a verification cookie in accordance with at least some embodiments.

FIG. 5 depicts a flow chart illustrating an example process for verifying a verification cookie in accordance with at least some embodiments. In some embodiments, the process 500 depicted in FIG. 5 may correspond to step 318 of process 300. The process 500 may be performed by a service provider computer, such as the service provider computer 200 depicted in FIG. 2. The process 500 depicted in FIG. 5 assumes that the state of an account for which access has been requested is determined to be a high-risk state (i.e., a potential breach has been detected).

In some embodiments, process 500 may involve receiving a verification cookie at 502. In some embodiments, a user device may provide the verification cookie upon attempting to login to an account maintained by the service provider. In some embodiments, the verification cookie may be received along with login credentials for the account (e.g., on an account login website). In some embodiments, the verification cookie may include at least an obscured device identifier and a creation date. The obscured device identifier may be a device identifier which has been obscured using some algorithm or technique known to the service provider, but not known to the public. For example, the device identifier may be hashed using one or more values and hash algorithms known to the service provider. The creation date may be a date upon which the verification cookie was originally created for the user device (i.e., a date on which the user device first accessed the account). In some embodiments, the verification cookie may also include one or more access dates that represent dates on which the user device has accessed the account. The verification cookie may also include any other suitable information relevant to the user device and/or the account.

Additionally, process 500 may involve receiving a device identifier at 504. In some embodiments, the device identifier may be received concurrently with the verification cookie (i.e., within the same message or in the same communication session). In some embodiments, the device identifier received at 504 may be received in an un-obscured (i.e., unencrypted and/or unhashed) form. In some embodiments, the device identifier received at 504 may be received in an encrypted form. For example, a user device may encrypt the device identifier using a cryptographic key (i.e., a public key) associated with the service provider so that it can only be decrypted using a second cryptographic key (i.e., a private key) associated with the service provider. Whether or not the device identifier received at 504 is obscured, the service provider should be able to obtain an unobscured version of that device identifier 504.

At 506, the process 500 may involve retrieving an obscured device identifier and creation date from the verification cookie. In some embodiments, the obscured device identifier may be a hash of the device identifier, which would make the original device identifier irretrievable. In some embodiments, the obscured device identifier may be an encrypted version of the device identifier, which can be decrypted to retrieve the device identifier. In at least some of these embodiments, the obscured device identifier included within the verification cookie should be obscured in a way which is not readily reproducible by an entity other than the service provider. For example, in the case that the obscured device identifier is an encrypted version of the device identifier, the obscured device identifier may have been encrypted using a cryptographic key known only to the service provider (and other entities trusted by the service provider).

At 508, the process 500 may involve independently generating an obscured device identifier from the device identifier received at 504. It should be noted that this is an optional step, in that some embodiments of the disclosure may not require the generation of an obscured device identifier. For example, in the case that the obscured device identifier included within the verification cookie is an encrypted device identifier, it may not be necessary to independently generate an obscured device identifier at step 508. In embodiments in which an obscured device identifier is to be independently generated, this may involve obscuring the device identifier received at 504 in a manner substantially similar to the manner in which the device identifier received in the verification cookie at step 502 has been generated. For example, the service provider may use the same values and/or algorithms.

At 510, the process 500 may involve comparing the device identifier received in the verification cookie at step 502 to the device identifier received at step 504. In some embodiments, step 510 may involve comparing an obscured device identifier received in the verification cookie at step 502 to an obscured device identifier independently generated at step 508. In some embodiments, step 510 may involve comparing a decrypted version of the obscured device identifier received in the verification cookie at step 2 to the device identifier received at 504. If the two device identifiers do not match, then the process 500 determines that the verification has failed at 512. If the two device identifiers do not match, then the process 500 continues on to step 514.

At 514, the process 500 may involve determining whether a creation date included within the verification cookie is greater than (i.e., subsequent to) a breach date. A breach date may be any date upon which a suspected breach has occurred. For example, the service provider may identify account credentials being sold on the dark web and may therefore determine that the account has been breached. In this example, the breach date may be the date upon which the account credentials were first posted for sale, or the breach date may be determined to be some amount of time before the credentials were first posted for sale. In some embodiments, the service provider may identify login attempts on or around a time at which credentials were first posted for sale to identify a breach attempt. In some embodiments, if the creation date is greater than the breach date, then the service provider may assume that the user device was first used to access the account after the account had been breached. In this case, the current login attempt may be failed at 512. In some embodiments, the service provider may respond to the attempted login with a message that an "incorrect login/password has been used," even when valid login credentials have been provided.

At 516, the process 500 may involve successfully verifying the verification cookie on the user device. In some embodiments, since the account has been breached, the user may immediately be required to change his or her account password.

In some embodiments, if verification of the verification cookie is failed at step 512, the process 500 may further involve generating a verification cookie that indicates that the user device is a compromised device. This verification cookie is then provided to the user device so that future login attempts may be automatically failed. In some embodiments, this indication of a compromised device may be removed from the user device after some threshold amount of time or upon receiving instructions from the service provider computer to be removed.

Figure 6:
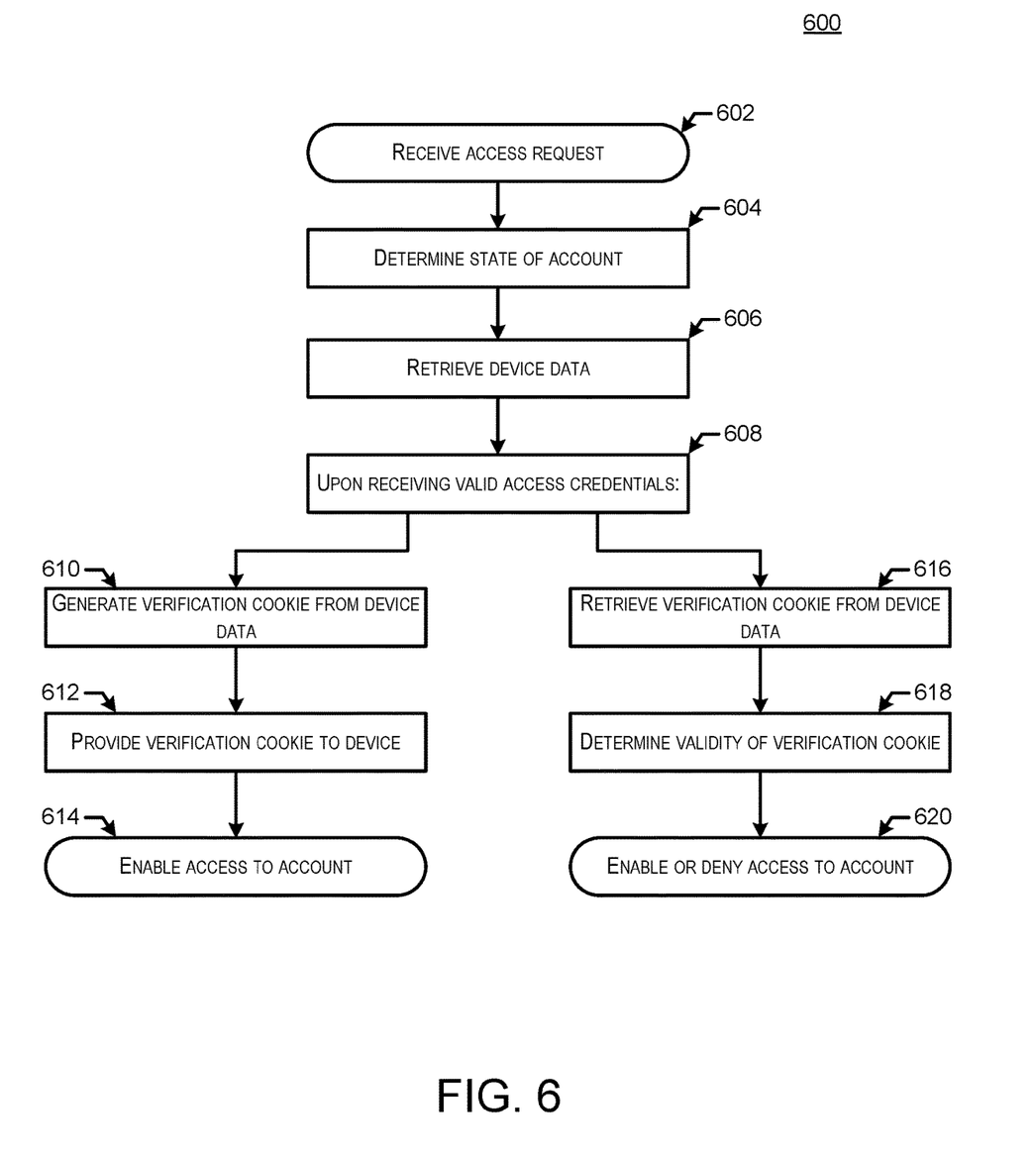
FIG. 6 depicts a flow diagram illustrating a process for enabling or denying access to an account using verification cookies in accordance with at least some embodiments.

FIG. 6 depicts a flow diagram illustrating a process for enabling or denying access to an account using verification cookies in accordance with at least some embodiments. The process 600 may be performed by a service provider such as the service provider 200 depicted in FIG. 2.

Process 600 may begin at 602, when an access request is received with respect to an account maintained by a service provider. In some embodiments, the access request may be received via a login page of a website maintained by the service provider upon a login attempt by a user device. In some embodiments, the access request may include a verification cookie retrieved from a user device from which the access request is received. Additionally, access credentials for the account may be received along with the access request.

At 604, the process 600 may involve determining a current state of an account for which the access request was received. In some embodiments, this may involve determining whether a potential breach has occurred with respect to the account, and the account is determined to be in a high-risk state if a breach is detected with respect to the account. For example, the service provider may identify access credentials for a particular user or user account on a website (e.g., on the darkweb) which may be available for sale. In this example, the service provider may determine that the account has been breached, with the date that the information has been made available for sale (or some amount of time prior) being the breach date.

At 606, the process 600 may involve retrieving device data. In some embodiments, this may involve receiving a device identifier from the user device attempting to access the account as well as a verification cookie stored in the memory of the user device. The verification cookie may be determined to be relevant to the account based on an identifier included in the verification cookie (e.g., an application identifier).

At 608, the process 600 may involve determining whether valid access credentials have been received with respect to the access attempt. In other words, the service provider may determine whether the access credentials provided in the login attempt (or a hash of those access credentials) match values stored in relation to the account.

At 610, the process 600 may involve, upon determining that the account is in a low-risk state, generating a verification cookie from the device data. In some embodiments, the verification cookie is encrypted using a cryptographic key known to the service provider computer At 612, the process 600 may involve providing the verification cookie to the user device. In some embodiments, this may involve replacing an existing verification cookie stored in the memory of the user device. In some embodiments, the verification cookie may only be generated and/or provided to the user device if the user device does not already have a verification cookie in its memory. At 614, the process 600 may involve enabling access to the account.

At 616, the process 600 may involve, upon determining that the account is in a high-risk state (i.e., that there has been a potential breach with respect to the account), retrieving a verification cookie from the device data. The verification cookie retrieved from the user device may have been generated in response to determining that the previous request to access the account via the user device was made while the account was in a low-risk state At 618, the process 600 may involve determining a validity of the verification cookie. In some embodiments, this may involve determining whether an obscured device identifier in the verification cookie corresponds to, or matches, the device identifier provided by the user device. For example, the obscured device identifier may be an encrypted version of a device identifier, and determining whether the obscured device identifier in the verification cookie matches the device identifier may involve decrypting the obscured device identifier and comparing the decrypted result to the device identifier. In another example, the obscured device identifier may be a hashed version of a device identifier, and determining whether the obscured device identifier matches the device identifier may involve hashing the device identifier and comparing the hashed result to the obscured device identifier. Determining whether the verification cookie is valid may also involve determining whether a creation date of the verification cookie is before or after a date attributed to a breach detected with respect to the account.

At 620, the process 600 may involve enabling or denying access to the account based on the validity of the verification cookie. In some embodiments, upon determining that the account is in a high-risk state, and upon determining that the login credentials are valid, the process may further involve initiating a password reset process via the user device if the verification cookie is valid. In at least some of these embodiments, the account may be placed in a low-risk state upon completion of the password reset process. In some embodiments, the process may involve generating a second verification cookie upon determining that the verification cookie is not valid, the second verification cookie indicating that the user device is not authorized to access the account. In at least some of these embodiments, the process may involve, upon receiving the second verification cookie in a subsequent request to access the account, automatically denying access to the account. In some embodiments, the process may involve, upon determining that the verification cookie is not valid, provide a notification that the login credentials are not valid. For example, even though a user has entered the correct login and password, he or she may be presented with a notification that the login and/or password is not correct if the verification cookie is not found to be valid. The user may be instructed to contact customer service to regain access to the account.

Embodiments of the disclosure provide for a number of advantages over conventional systems. For example, embodiments of the invention enable a user to regain access to a hacked account with minimal effort, while maintaining a high level of security. Additionally, embodiments of the invention do not suffer from a number of pitfalls of conventional systems. For example, in conventional systems, a user may have no recourse but to contact a customer service representative. In this example, the customer service representative has no ideal way to determine whether the person claiming to be the account holder is actually the account holder. Conventionally, the customer service representative may ask the person to verify personal details. However, in the event that a user's password has been obtained by an unauthorized party, that unauthorized party may have access to any number of accounts, including social media, financial, and email accounts. Hence, the unauthorized party may have access to the personal details that a customer service representative is likely to ask which would render these methods of verification useless. Embodiments of the current disclosure do not suffer from these pitfalls in that a user is verified by virtue of using a device that she has used in the past, which presumably only she has access to. Additionally, embodiments of the disclosure are unobtrusive, in that a user need not perform a significant amount of work outside of his or her typical account access process in order to restore the account.

In some embodiments, a user that does not have a valid verification cookie may be required to contact a customer service representative in order to regain account access (e.g., via a regular account recovery process). In this scenario, the customer service representative may be presented with details related to the detected breach (e.g., PII attributes that were leaked) so that the customer service representative can verify the user's identity using different information. For example, consider a scenario in which User A's credentials, social security number (SSN) and phone number have been leaked on the dark web (Internet). In this scenario, the customer service representative will not ask account recovery questions that involve a SSN or a phone number. Instead the customer service representative will ask questions on other known attributes of the user in order to recover the account, such as a physical address, a driver's license no. etc.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a," "an" or "the" is intended to mean "at least one," unless specifically indicated to the contrary.

What is claimed is:

1. A method comprising:
   receiving, at a service provider computer from a user device, a request to access an account, the request including a device identifier and login credentials;
   determining, by the service provider computer, whether the account is in a high-risk state or a low-risk state;
   upon determining that the account is in a low-risk state, and upon determining that the login credentials are valid:
      generating a verification cookie from the device identifier;
      providing the verification cookie to the user device for storage in a memory of the user device; and
      providing access to the account via the user device; and
   upon determining that the account is in a high-risk state, and upon determining that the login credentials are valid:
      retrieving the verification cookie from the memory of the user device;
      determining whether the verification cookie is valid, the determining comprises:
         determining whether a creation date of the verification cookie is before or after a date attributed to a breach detected with respect to the account; and
      providing access to the account via the user device only if the verification cookie is valid.

2. The method of claim 1, wherein the account is determined to be in a high-risk state if a breach is detected with respect to the account.

3. The method of claim 1, wherein upon determining that the account is in a high-risk state, and upon determining that the login credentials are valid, the method further comprises completing a password reset process via the user device.

4. The method of claim 3, wherein the account is placed in a low-risk state upon completing the password reset process.

5. The method of claim 1, wherein providing the verification cookie to the user device for storage in the memory of the user device comprises replacing an existing verification cookie stored in the memory of the user device.

6. The method of claim 1, wherein the verification cookie is encrypted using a cryptographic key known to the service provider computer.

7. The method of claim 1, wherein determining whether the verification cookie is valid comprises determining whether an obscured device identifier in the verification cookie matches the device identifier.

8. The method of claim 7, wherein the obscured device identifier is an encrypted version of a device identifier, and wherein determining whether the obscured device identifier matches the device identifier comprises decrypting the obscured device identifier and comparing the decrypted result to the device identifier.

9. The method of claim 7, wherein the obscured device identifier is a hashed version of a device identifier, and wherein determining whether the obscured device identifier matches the device identifier comprises hashing the device identifier and comparing the hashed result to the obscured device identifier.

10. A service provider computer comprising:
    a processor; and
    a memory including instructions that, when executed with the processor, cause the service provider computer to, at least:
       receive, from a user device, a request to access an account, the request including a device identifier and login credentials;
       determine a current state of the account;
       upon determining that the current state of the account is a high-risk state, and upon determining that the login credentials are valid:
          retrieve a verification cookie from the memory of the user device;
          determine whether the verification cookie is valid, wherein determining comprises:
             determining whether a creation date of the verification cookie is before or after a date attributed to a breach detected with respect to the account; and
          provide access to the account via the user device only if the verification cookie is valid.

11. The service provider computer of claim 10, wherein the verification cookie has been generated by the service provider computer and provided to the user device in response to a previous request to access the account via the user device.

12. The service provider computer of claim 11, wherein the verification cookie has been generated in response to determining that the previous request to access the account via the user device was made while the account was in a low-risk state.

13. The service provider computer of claim 10, wherein the instructions further cause the service provider computer to generate a second verification cookie upon determining that the verification cookie is not valid, the second verification cookie indicating that the user device is not authorized to access the account.

14. The service provider computer of claim 13, wherein the instructions further cause the service provider computer to, upon receiving the second verification cookie in a subsequent request to access the account, deny access to the account.

15. The service provider computer of claim 10, wherein the instructions further cause the service provider computer to, upon determining that the verification cookie is not valid, provide a notification that the login credentials are not valid.

16. The service provider computer of claim 10, wherein the instructions further cause the service provider computer to initiate a password reset upon providing access to the account via the user device.

17. The service provider computer of claim 10, wherein determining whether the verification cookie is valid comprises determining whether an obscured device identifier included in the verification cookie corresponds to the device identifier.

18. A service provider computer comprising:
a processor; and
a memory including instructions that, when executed with the processor, cause the service provider computer to, at least:
receive, from a user device, a request to access an account, the request including a device identifier and login credentials;
determine a current state of the account;
upon determining that the current state of the account is a high-risk state, and upon determining that the login credentials are valid:
retrieve a verification cookie from the memory of the user device;
determine that the verification cookie is not valid;
generate a second verification cookie upon determining that the verification cookie is not valid, the second verification cookie indicating that the user device is not authorized to access the account; and
upon receiving the second verification cookie in a subsequent request to access the account, deny access to the account.

* * * * *